Nov. 15, 1949

E. H. HALVORSON 2,488,188

TELESCOPIC SIGHT PROTECTOR

Filed May 15, 1947

Inventor
Earl H. Halvorson

By Clarence A. O'Brien
and Harvey B. Jacobson
Attorneys

Patented Nov. 15, 1949

2,488,188

UNITED STATES PATENT OFFICE 2,488,188

TELESCOPIC SIGHT PROTECTOR

Earl H. Halvorson, John Day, Oreg.

Application May 15, 1947, Serial No. 748,208

1 Claim. (Cl. 33—50)

This invention relates to a protector for a telescopic sight of the type commonly employed on firearms, transits, telescopes and the like and has for its primary object to protect the lenses from injury and against the collection of dirt and dust.

Another object is to preserve the visibility through the optical instrument while it is being transported and yet enable the telescope to be made instantly ready for use.

The above and other objects may be attained by employing this invention which embodies among its features a band adapted to be clamped about the telescope adjacent one end thereof, a cover pivoted to the band and adapted to be swung into a position to close the end of a telescope, said cover when being so closed protecting the lens adjacent the end of the telescope closed by the cover against injury, means yieldingly to urge the cover away from telescope closing position and a trigger actuated latch carried by the band to hold the cover in telescope closing position.

Figure 1:
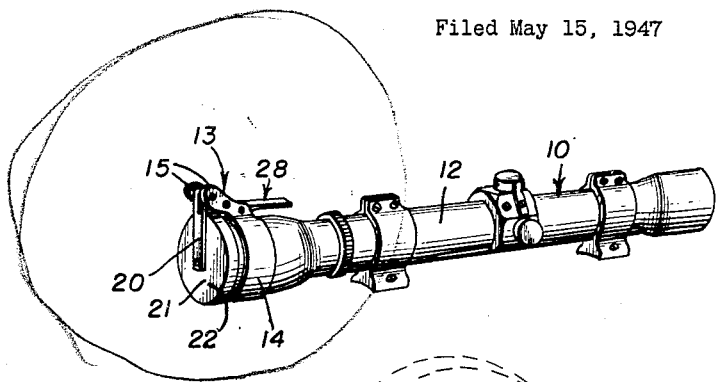
Figure 1 is a perspective view of a telescopic gun sight showing this improved protector in place on the objective end thereof.

Referring to the drawings in detail a conventional telescope designated generally 10 is equipped with conventional lenses 11 mounted in a barrel 12 of conventional form.

Figure 2:
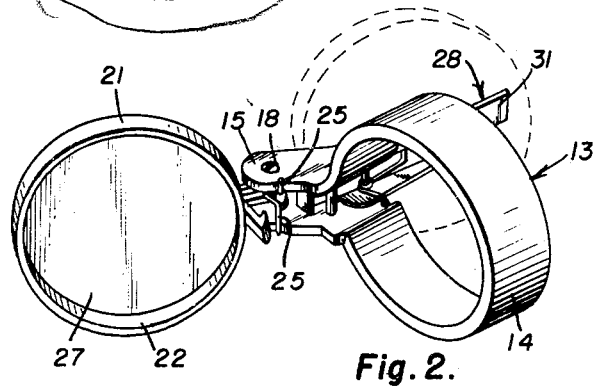
Figure 2 is a perspective view of the protector showing the cover in open position.
Figure 3:
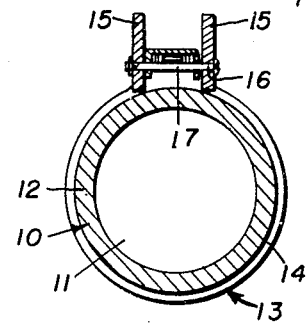
Figure 3 is a transverse sectional view through the telescope, illustrating the lens protector in place thereon, certain portions of the latter being shown in section.
Figure 5:
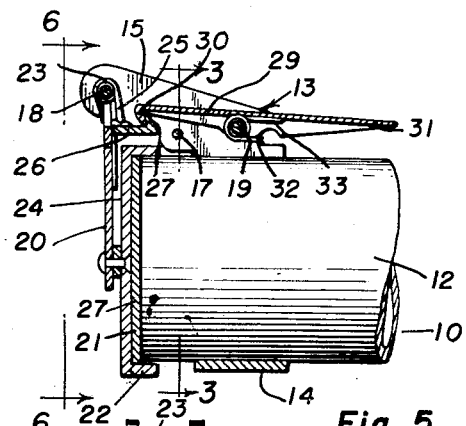
Figure 5 is a longitudinal sectional view through the lens protector, illustrating it mounted on a fragment of a telescope barrel.
Figure 4:
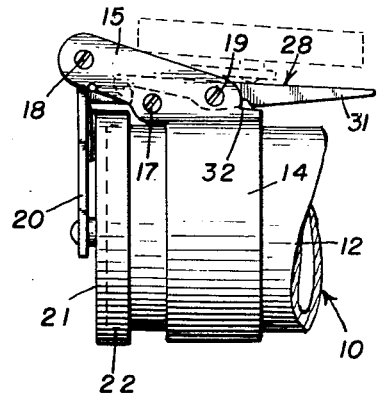
Figure 4 is a side view of the lens protector showing it clamped about a fragment of the telescope.
Figure 6:
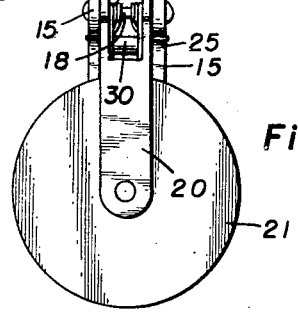
Figure 6 is an end view of Figure 5.

My improved lens protector designated generally 13 comprises a band 14 which is adapted to be clamped about the barrel 12 adjacent one end in any conventional manner. The band 14 is provided with a pair of spaced parallel ears 15 which project outwardly therefrom and extend beyond the adjacent end of the barrel 12 as will be readily understood upon reference to Figures 2, 4 and 5. These ears are provided intermediate their ends with aligning openings 16 through which a clamping bolt 17 extends in order to affect a clamping of the band about the barrel 12. Formed in the ears 15 adjacent their overhanging ends are aligning openings for the reception of a pivot bolt 18, and formed near the opposite ends of the ears 15 are aligned openings for the reception of a second pivot bolt 19.

Pivotally supported between the ears 15 on the pivot bolt 18 is an arm 20 carrying adjacent its free end a cap 21. This cap is provided with an annular flange 22 which when the device is in use normally overlies the adjacent end of the barrel 12 as will be readily understood upon reference to Figures 4 and 5. Coiled about the pivot pin 18 is a spring 23 one leg 24 of which bears against the lever arm 20, while the opposite leg 25 of the spring bears against the under edge of an ear 15 so as yieldingly to urge the cap 21 out of closing contact with the end of the barrel 12. Projecting rearwardly from the arm 20, in spaced relation to the barrel 12 is a keeper 26 having a hook 27 at its free end and fitted in the cover 21 within the confines of the flange 22 is a sponge rubber cushion 27 which is adapted to co-operate with the end of the barrel 12 in forming a dust tight junction between the barrel and the cap.

Pivotally supported on the pivot pin 19 is a trigger actuated latch designated generally 28 which comprises a latch lever 29 carrying at one end a hook 30 which is adapted to engage the hook 27 to hold the cover 21 in closed position against the end of the barrel 12 and against movement under the influence of the spring 23. The opposite end of the arm 29 forms a trigger 31 by which the latch may easily and quickly be released when it is desired to use the telescope. A spring is coiled about the pivot pin 19 and one arm 32 thereof bears against the ears 15, while the opposite arm 33 of said spring bears against the trigger 31 so as yieldingly to urge the hook 30 into engagement with the hook 27 as will be readily understood upon reference to Figure 5.

In use the band is clamped about the barrel 12 adjacent the end of the telescope that is to be protected and the cap 21 swung into closed position over the end of the telescope as illustrated in the drawings. In this position the hook 30 on the latching trigger 28 will engage the hook 27 and hold the cover 21 against movement of the influence of the spring 23. When it is desired to use the telescope it is only necessary to exert pressure on the trigger 31 to swing it about its pivot 19 against the urge of the spring arms 32 and 33 so as to disengage the hook 30 from the hook 27. Upon disengagement of the hooks the spring 23 will swing the arm 20 and cover 21 about the axis of the pivot 18 into the position illustrated by the broken lines in Figure 4 so as to clear the sight through the telescope. In this way the lenses of the telescope may be protected against injury during transportation and yet by exerting pressure on the trigger 31 the telescope may be instantaneously uncovered ready for use.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

A lens protector attachment for a telescopic gun sight or the like comprising a band demountably clamped about the sight adjacent one end thereof, a pair of spaced parallel ears projecting laterally from the band, the forward ends of the ears projecting beyond the end of the sight adjacent the band, a cover supported between the ears adjacent their forward ends to swing about an axis perpendicular to the gun sight into sight closing position, a spring between the ears yieldingly to urge the cover into open position relative to the sight, a keeper carried by the cover adjacent the ears, a trigger actuated latch supported between the ears to rock about an axis which lies in spaced parallel relation to the axis about which the cover swings and yielding means between the ears to hold the latch in engagement with the keeper releasably to hold the cover in closed position on the end of the sight.

EARL H. HALVORSON.

REFERENCES CITED

The following references are of record in the file of this patent:

FOREIGN PATENTS

| Number | Country | Date |
| --- | --- | --- |
| 319,977 | Germany | 1920 |